(12) United States Patent
Miller

(10) Patent No.: US 6,267,527 B1
(45) Date of Patent: Jul. 31, 2001

(54) DOWEL AND METHOD OF USING SAME

(76) Inventor: Michael Miller, 248 Linden St., Winnetka, IL (US) 60093

( * ) Notice: Subject to any disclaimer, the term of this patent is extended or adjusted under 35 U.S.C. 154(b) by 0 days.

(21) Appl. No.: 09/493,885

(22) Filed: Jan. 28, 2000

(51) Int. Cl.[7] .................................................. F16B 12/36
(52) U.S. Cl. ........................ 403/292; 403/408.1; 403/298; 403/283; 411/530
(58) Field of Search ..................... 403/408.1, 409.1, 403/346, 274, 279, 280, 373, 374.1, 283, 298, 292, FOR 292, FOR 298; 411/513, 530

(56) References Cited

U.S. PATENT DOCUMENTS

| | | | |
|---|---|---|---|
| 100,055 | * | 2/1870 | Montgomery . |
| 332,308 | | 12/1885 | Valentine . |
| 876,985 | | 1/1908 | Malancon . |
| 1,229,565 | | 6/1917 | Ahlgren . |
| 2,667,795 | | 2/1954 | Bowen . |
| 3,221,458 | | 12/1965 | Lucas . |
| 3,527,486 | * | 9/1970 | Gamp ................................... 403/298 |
| 3,575,520 | | 4/1971 | Halpern . |
| 3,635,573 | | 1/1972 | Halpern . |
| 3,850,054 | | 11/1974 | Weissman . |
| 3,883,258 | * | 5/1975 | Hewson . |
| 4,340,327 | | 7/1982 | Martins . |
| 4,536,044 | * | 8/1985 | Ziegelheim . |
| 4,793,745 | | 12/1988 | Ashbaugh et al. . |
| 4,815,902 | | 3/1989 | Durfee, Jr. . |
| 4,884,571 | | 12/1989 | Baker . |
| 5,100,162 | | 3/1992 | Lo . |
| 5,131,783 | * | 7/1992 | Astl . |
| 5,232,302 | * | 8/1993 | Wagner et al. . |
| 5,265,988 | | 11/1993 | Schmigalla et al. . |
| 5,326,196 | | 7/1994 | Noll . |
| 5,529,424 | * | 6/1996 | Neubert et al. . |
| 5,768,845 | | 6/1998 | Beaulieu et al. . |
| 5,771,650 | | 6/1998 | Williams et al. . |

FOREIGN PATENT DOCUMENTS

| | | | | |
|---|---|---|---|---|
| 465953 | * | 6/1950 | (CA) | ..................................... 403/298 |
| 663 065 A5 | | 11/1987 | (CH) . | |
| 1947456 | * | 9/1970 | (DE) | ..................................... 403/292 |
| 3820351 | * | 12/1989 | (DE) | ..................................... 403/292 |
| 663069-A5 | * | 11/1987 | (FR) | ..................................... 403/292 |
| 11581 | * | 8/1887 | (GB) . | |
| 221280 | * | 9/1924 | (GB) | ..................................... 403/292 |
| 475429 | * | 10/1952 | (IT) | ..................................... 403/292 |

* cited by examiner

Primary Examiner—Lynne H. Browne
Assistant Examiner—Tomlyne A Malcolm
(74) Attorney, Agent, or Firm—Welsh & Katz, Ltd.

(57) ABSTRACT

An improved dowel that is capable of quickly and easily connecting two or more adjoining components. In one form of the invention, a dowel is provided, that, may be used for connecting two or more components. In one embodiment, the dowel may have three dowel sections positioned between a base and a tip. Each dowel section has a diameter and may be positioned axially adjacent at least one other dowel section wherein the diameters decrease over the length of the dowel from the base to the tip. Alternate embodiments may have two, four or more dowel sections.

20 Claims, 3 Drawing Sheets

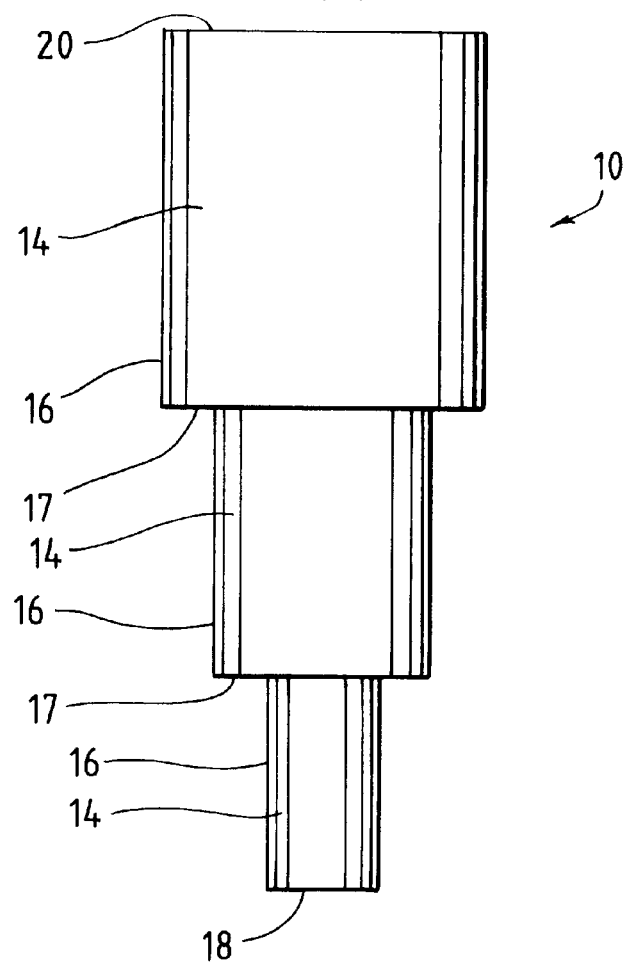
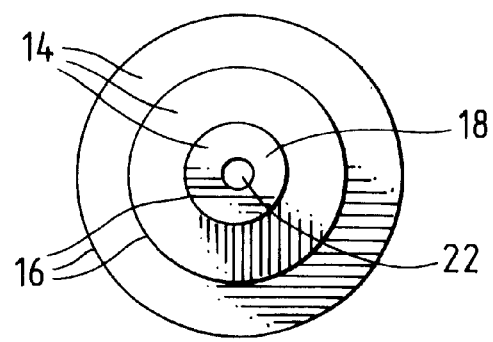

DOWEL AND METHOD OF USING SAME

FIELD OF THE INVENTION

The present invention relates to dowels, and more particularly to dowels that provide for decreasing diameters over the length of the dowel and provide for enhanced connection of adjoining components.

BACKGROUND OF THE INVENTION

Dowels of various types are known in the art. Such devices are typically used in the furniture industry for joining the various components of a furniture assembly. Dowels are used in other industries as well, for example, dowels may be used to join landscaping timber. During construction, a dowel is driven into an opening, such as a circular shaped bore, of one of the furniture components that comprise the assembly. The second furniture component to be connected to the first furniture component is also provided with an opening for the dowel. The opening in the second furniture component is aligned with the opening in the first furniture component. The dowel that is mounted to the first component is then inserted and driven into the opening in the second component. Pressure may be applied to the two components when the dowel is being driven into the opening in the second component. Since the dowel's diameter is greater in size then the diameters of the openings, the dowel is held in the openings by the frictional forces exerted on the dowel's outer side walls by the inner side walls of the openings in the two components.

However, existing dowels known in the art have some inherent disadvantages. One of the disadvantages with existing dowels is that, when inserting the dowel in the openings of the adjoining components, a high pressure must be applied to overcome the frictional force which acts on the contact surface between the outer wall surface of the dowel and the inner wall surface of the opening and acts opposite to the dowel's insertion direction. As a result, when the dowel is inserted into the openings, an undesirable deformation of the opening's inner wall surface may occur. This deformation may impair the connection of the dowel with the component. Further, if the dowel experiences extreme stress the dowel may be damaged and may break. Safety issues are also a concern, if the stresses on the dowel are such that the dowel splits into more than one piece, the user may be injured by material splinters.

The present invention overcomes these and other problems inherent in existing dowels. The present invention provides a dowel that has multiple sections that decrease in diameter over the longitudinal axial length of the dowel. The decreasing diameters of the dowel sections minimize the frictional forces and resultant stresses exerted on the dowel during insertion of the dowel into the component openings. Thus, the user experiences easier insertion of the dowel into the openings of the components. Also, the dowel is less prone to breakage and user safety is enhanced. Further, while the dowel provides a secure, locked component fit, the components experience considerably less deformation when the dowel is inserted into the respective openings. Since component deformation is minimized, the components last longer and their appearance does not deteriorate.

The dowel of the present invention requires component openings that can accept the dowel. The prior art also does not provide a tool or device that can create these specifically shaped openings. Thus, a drill bit that can create these openings is needed in the art. The present invention provides a drill bit that has multiple sections that decrease in diameter over the longitudinal axial length of the drill bit. The drill bit may be used to form component openings that are properly shaped and sized to accept the dowel of the present invention.

OBJECTS OF THE INVENTION

The principal object of the present invention is to provide an improved dowel having multiple sections that decrease in diameter over the longitudinal axial length of the dowel.

Another object of the present invention is to provide a novel dowel that is easier to insert into a component opening.

Still another object of the present invention is to provide a novel dowel that will provide for minimal deformation of the component that it is being inserted into.

Yet another object of the present invention is to provide a novel dowel that will provide for alignment of the components that the dowel is being inserted into.

A further object of the present invention is to provide a novel dowel that is safer to use.

A further object of the present invention is to provide a novel dowel which is simple in design and inexpensive to construct, and is durable and rugged in structure.

A further object of the present invention is to provide a novel drill bit that will create an opening in one or more components that the dowel will fit into.

Another object of the present invention is to provide a novel drill bit having multiple sections that decrease in diameter over the longitudinal axial length of the drill bit.

A further object of the present invention is to provide a novel drill bit which is simple in design and inexpensive to construct, and is durable and rugged in structure.

Still further objects and advantages will become apparent from a consideration of the ensuing description and drawings of the invention.

SUMMARY OF THE INVENTION

These and other objects are achieved by a dowel of the present invention. In one form of the invention, a dowel is provided that may be used for connecting two or more components. In one embodiment, the dowel may have three dowel sections positioned between a base and a tip. Each dowel section has a diameter and may be positioned axially adjacent at least one other dowel section wherein the diameters decrease over the length of the dowel from the base to the tip. Alternate embodiments may have two, four or more dowel sections.

BRIEF DESCRIPTION OF THE DRAWINGS

FIG. 1 is a side view of one embodiment of the dowel of the present invention;

FIG. 2 is an end view of the dowel of FIG. 1 further including an insert;

DETAILED DESCRIPTION

Figure 3:
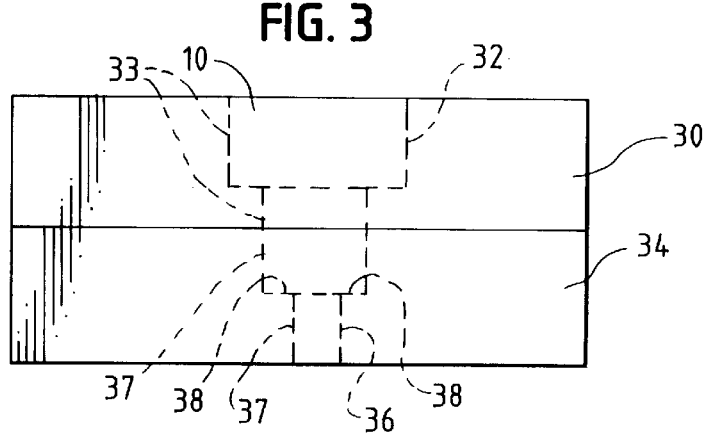
FIG. 3 is a view of the dowel of FIG. 1 shown inserted into two openings and connecting two components together.

FIG. 1 is a side view of one embodiment of the dowel 10 constructed in accordance with the present invention. FIG. 1 shows one embodiment of the dowel 10 which is comprised of dowel sections 14 having side walls 16, step portions 17, a tip 18 and a base 20. Each dowel section 14 may have a substantially circular shaped cross section as taken perpendicular to the dowel section 14 longitudinal axis. As shown in FIG. 1, in one embodiment, dowel sections 14 may be substantially cylindrical in shape. Other embodiments of the dowel 10 may be constructed so that each dowel section 14 has a substantially square or triangular shaped cross section as taken perpendicular to the dowel section 14 longitudinal axis.

As shown in FIGS. 1 and 2, the three dowel sections 14 may extend from the base 20 and may be longitudinally axially aligned relative to the base 20 such that the dowel sections 14 are of descending diameter from the base 20 to the tip 18. Depending on the specific application, alternate embodiments of the dowel 10 may include two, four or more dowel sections 14. In one embodiment, the individual dowel sections 14 diameters may be sized in the range of 125 mm to 6 mm, 120 mm to 4 mm and 115 to 2.5 mm respectively. In alternate embodiments, the individual dowel sections' 14 diameters may be any size and may be joined in any combination required for the particular application that dowel 10 is being used in. The length of each individual dowel section 14 may vary considerably depending on the application and the dimensions of components 30 and 34 (see FIG. 3) that will be joined. In one embodiment, the dowel section 14 having the smallest diameter has a length that is as long as or longer than the length of any of the other dowel sections 14.

The material selection for the dowel 10 may be dictated by such factors as, the dimensions of dowel sections 14, number of dowel sections 14 and components 30, 34 material type and/or dimensions. One embodiment of the dowel 10 may be constructed of wood such as, for example, mahogany, fir, birch, cedar or pine. In other embodiments, the dowel 10 may be constructed of plastic, metal or any other type of material that will provide for proper operation of the dowel 10. The dowel 10 may also be constructed of a combination of two or more materials. For example, as shown in FIG. 2, the dowel 10 may be constructed of wood and contain a metal post or insert 22 that runs longitudinally axially through the dowel 10 from base 20 to tip 18.

Figure 4A:
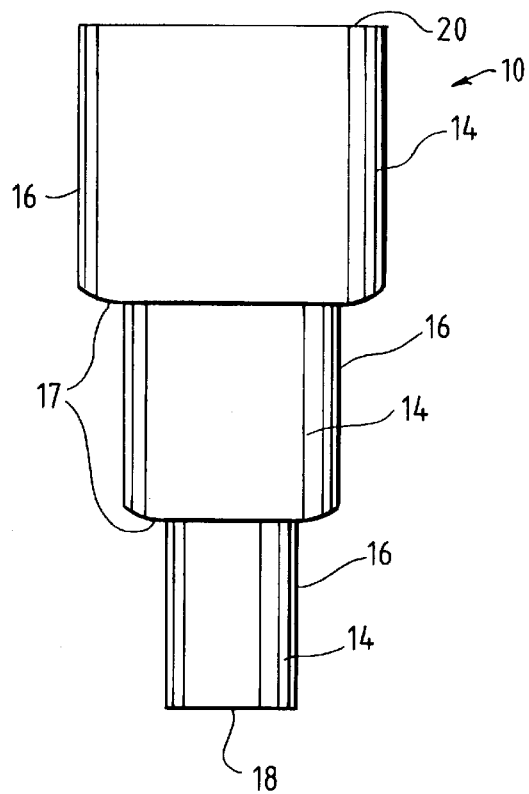
FIG. 4a is a side view of an alternate embodiment of the dowel of FIG. 1.
Figure 4B:
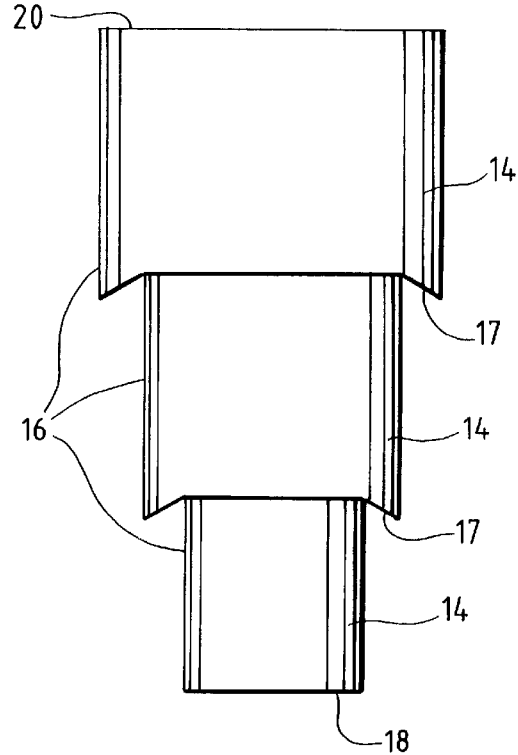
FIG. 4b is a side view of another alternate embodiment of the dowel of FIG. 1

As shown in FIG. 1, step portion 17 may be formed by a ninety degree angle with respect to the dowel 10 longitudinal axis. However, depending on the application, the step portion 17 may be configured in a variety of different ways. In alternate embodiments of dowel 10, as shown in FIG. 4a, step portion 17 may be beveled or convex in shape. Beveled step portion 17 may provide dowel 10 with increased strength to prevent breakage if dowel 10 experiences unusually high tensile or shear forces in a particular application. Also, depending on the type of material dowel 10 is constructed of, the beveled step portion 17 may provide a more secure fit when in use and joining two components 30 and 34. In yet other embodiments, the step portion 17 may be recessed or concave in shape as shown in FIG. 4b. In still yet other embodiments, the step portion 17 may be rounded or any other shape that will provide for proper operation of dowel 10 when used in a particular application.

Dowel 10 may be constructed in a variety of different ways using a variety of different manufacturing tools and techniques. For example, dowel 10 may be constructed using a lathe, a tool that is well known in the art. Further, each individual dowel section 14 may be constructed separately and the individual sections 14 may be joined together to form the composite dowel 10. For example, in one embodiment, dowel sections 14 may be fixed together using any type of adhesive or the sections 14 may be fastened together using a fastener such as nails, metal posts or any other type of fastener that will provide for proper operation of dowel 10.

Figure 5:
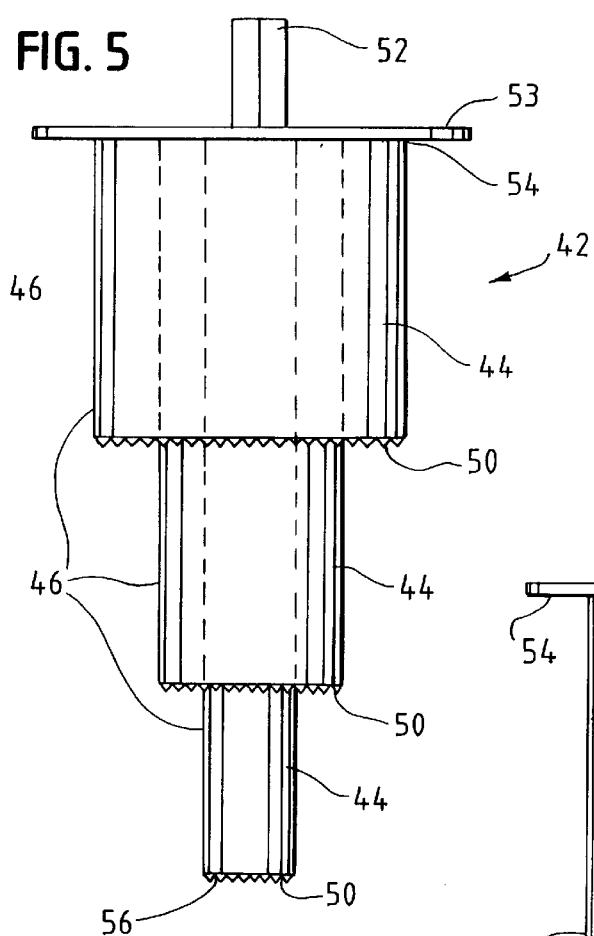
FIG. 5 is a side view of one embodiment of a drill bit used to construct the openings in the components of FIG. 3.
Figure 6:
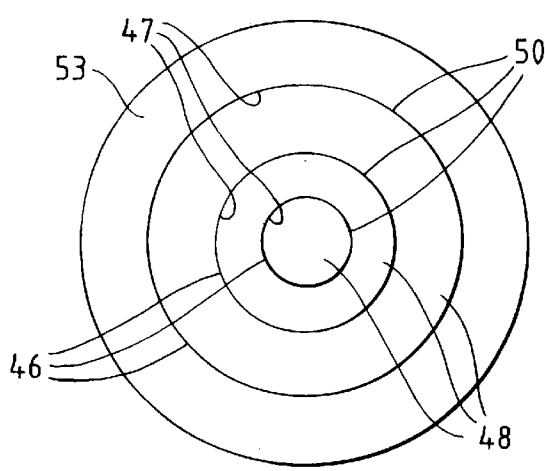
FIG. 6 is a an end view of an alternate embodiment of the drill bit of FIG. 5.

As shown in FIGS. 5 and 6, a drill bit 42, may be used to make the openings 32 and 36 in components 30 and 34, respectively. Drill bit 42 may comprise a plurality of drill sections 44, each having sidewalls 46, inner sidewalls 47, inner portions 48, teeth 50, a shaft 52, a stop plate 53, a base 54 and a tip 56. Each drill section 44 may have a substantially circular shaped cross-section as taken perpendicular to the drill section 44 longitudinal axis. FIG. 5 also shows that in one embodiment of the drill bit 42, three drill sections 44 may extend from the stop plate 53 and may be longitudinally axially aligned relative to stop plate 53 such that drill sections 44 are of descending diameter from the base 54 to the tip 56. Depending on the type and size of openings 32, 36 required, alternative embodiments of drill bit 42 may include two, four or more drill sections 44. In one embodiment, individual drill sections 44 diameters may be sized in the range of 126 mm to 6.5 mm, 121 mm to 4.5 mm and 116 mm to 2.5 mm. In still other embodiments, individual drill sections 44 diameters may be any size and may be joined in any combination required for the particular openings 32, 36 required. The length of each individual drill section 44 may vary considerably depending on the application and the dimensions of components 30 and 34 (see FIG. 3) that will be joined.

The material selection for drill bit 42 may be dictated by such factors as, for example, the dimensions of drill sections 44, number of drill sections 44 and components 30, 34 material type and/or dimensions. One embodiment of drill bit 42 may be constructed of metal such as, for example, hardened steel, stainless steel or titanium. In other embodiments, drill bit 42 may be constructed of any other type of material that will provide for proper operation of the drill bit 42. Drill bit 42 may also be constructed of a combination of two or more materials. For example, two of the drill sections 44 may be constructed of hardened steel and one drill section 42 may be constructed of titanium.

Teeth 50, as shown in FIG. 5, may be located on each drill section 44. In one embodiment, each tooth 50 may be positioned in close proximity to each adjacent tooth 50 so that there is no space between each tooth 50 and each adjacent tooth 50. In another embodiment, each tooth 50 may be spaced one tooth 50 width from each adjacent tooth 50. In yet another embodiment, each tooth 50 may be spaced from each adjacent tooth 50 any distance that is required for proper operation of the drill bit 42. Tooth 50 spacing, shape, size and material selection may be affected by, for example, components 30 and 34 material selection, length of drill bit 42, number of drill sections 44, and/or the rotation speed of the drill.

Figure 7:
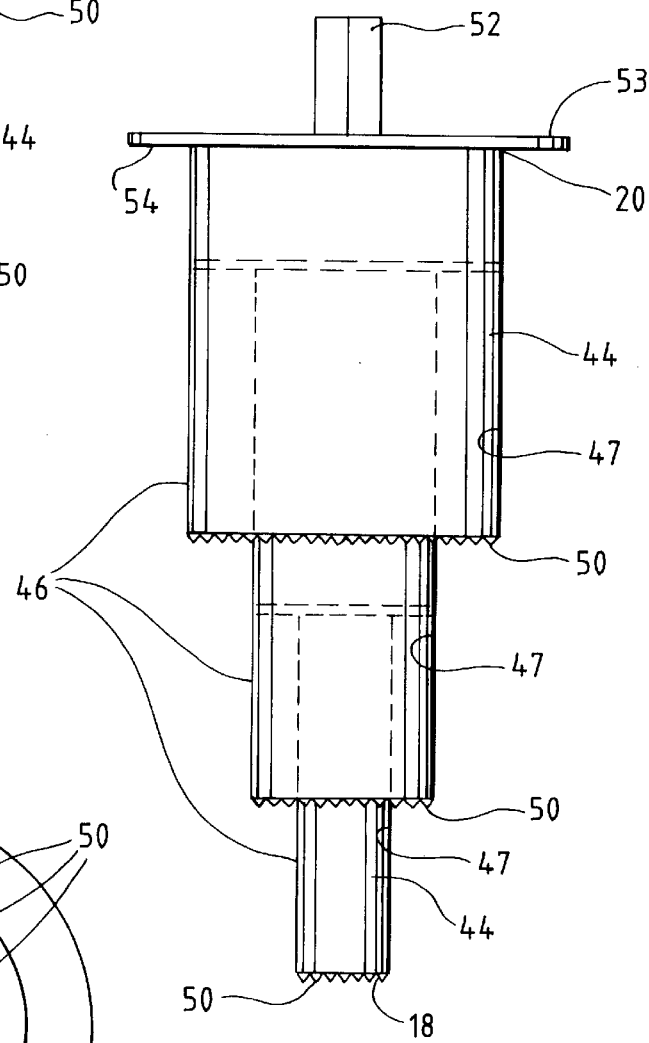
FIG. 7 is a side view of another alternate embodiment of the drill bit of FIG. 5.

Drill bit 42 may be constructed in a variety of different ways using a variety of different manufacturing tools and techniques. Further, each individual drill section 44 may be constructed separately and the individual sections 44 may be joined together to form composite drill bit 42. For example, in one embodiment, drill sections 44 may be spot welded to stop plate 53. As shown in FIG. 7, in another embodiment, drill sections 44 may be fixed to the inner side walls 47 of each adjacent drill section 44. Also, as shown in FIG. 5, in one embodiment drill sections 44 may be substantially hollow, whereby each adjacent smaller diameter drill section 44 may fit inside each adjacent larger diameter drill section 44. Certain applications may, however, require that at least a portion of one or more drill sections 44 have a solid inner portion 48.

Openings 32 and 36 may be made with drill bit 42. During use, shaft 52 may be inserted into a tool such as, for example, a hand held power driven drill. As shown in FIG. 3, first component 30 may be aligned with second component 34. Then, the drill rapidly rotates drill bit 42 and the user aligns the drill bit 42 with first component 30. The first contact with component 30 may be by teeth 50 of drill bit 42. The teeth 50 rotate and cut into first component 30. The user continues applying force to the drill which in tun further pushes rotating drill bit 42 into first component 30. This process continues until teeth 50 cut through and exit first component 30 and enter second component 34. The drill bit 42 then continues through second component 34 until teeth 50 exit component 34. The drill bit is then withdrawn from first and second components 30, 34 and openings 32, 36 have been formed.

As shown in FIG. 3, during use, force may be exerted on dowel base 20 causing the dowel 10 to be pressed into an opening 32 of first component 30. The opening 30 may be a circular shaped bore with sections 33 that decrease in bore diameter size along the length of opening 30. The opening's sections 33 may be sized so that the bore's inner diameter is slightly smaller than the outer diameter of the dowel section 14 that will be, when the dowel is completely in the opening 32, adjacent the corresponding opening's section 33. The second component 34 to be connected adjacent first component 30 may be provided with an opening 36 for dowel 10. Once dowel 10 is inserted into first opening 32 and tip 18 is extending out slightly past opening 32, the second component opening 36 may be aligned with first component opening 32. Dowel tip 18 in combination with bore section area 38 may provide for easy alignment of component openings 32,36. As a result of the minimal surface area of area 38, tip 18 can easily locate and be aligned with opening 36. Dowel tip 18 is then inserted into opening 36 in second component 34. Pressure may then be applied to the two components 30, 34 to hold them together as dowel 10 is driven into the second component opening 36. As the dowel 10 is inserted into the second component opening 36, the dowel 10 provides for proper alignment of first component 30 and second component 34. As shown in FIG. 3, when dowel 10 is fully in position in openings 32, 36, tip 18 and base 20 of dowel 10 may be substantially flush with the outer surfaces of the components 30, 34 and the first component 30 and the second component 32 will be properly allowed. Since dowel's 10 diameter is greater in size then the diameters of the corresponding openings sections 33, 36, dowel 10 is held tightly in openings 32, 36 by the frictional forces exerted on the dowel's outer side walls 16 by corresponding opening's 32, 36 inner side walls. Further, when dowel 10 is inserted into the openings 32, 36, steps 17 provide for first component 30 to be held tightly in place adjacent second component 34. In one embodiment each step 17 acts similar to the head of a nail whereby each step 17 prevents the components 30,34 from sliding off dowel 10 and separating from each other. Steps 17 also provide the added benefit that less adhesive, such as wood glue for example, is required for dowel 10. Normally, with prior art dowels, adhesive is applied along the entire length of the dowel before the dowel is inserted into the component openings. However, with the present dowel 10, if a user chooses to apply an adhesive to the dowel 10, adhesive is only needed on the portion of the dowel 10 that is inserted into the second component 34. Once an adhesive has been applied to the portion of dowel 10 positioned in the second component 34 and dowel 10 is fully in place in both components 30,34, the steps 17 of dowel 10 prevent the first component 30 from sliding off dowel 10 and separating from second component 34. The adhesive prevents the second component 34 from sliding off dowel 10 and separating from the first component 30.

The openings 32, 36 may be formed by a drill bit 42 as shown in FIG. 5 or by any other type of device that will provide for proper operation of the dowel 10. In alternate embodiments, the openings 32, 26 may be comprised of two, three, four or more sections 33, 37 of decreasing diameter depending on the characteristics and number of sections 14 that dowel 10 comprises. In still yet other embodiments, depending on the shape of dowel 10, the openings 32, 36 may have a cross section along the openings 32, 36 longitudinal axis that is substantially square shaped, triangular shaped or any other shape that will accept dowel 10.

Specific embodiments of novel methods and apparatus for construction of novel dowels and drill bits according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

I claim:

1. A dowel having a base and a tip for connecting two or more components, consisting of:
   at least three dowel sections, wherein each dowel section is positioned directly adjacent each adjoining dowel section, having sidewalls, each dowel section having a diameter wherein the diameters successively decrease over the length of the dowel from the base to the tip; and
   a step located where each dowel section is positioned directly adjacent another dowel section.

2. The dowel of claim 1 wherein the transverse cross-section of each dowel section is substantially circular in shape.

3. The dowel of claim 1 wherein the transverse cross-section of each dowel section is substantially square in shape.

4. The dowel of claim 1 wherein the transverse cross-section of each dowel section is substantially triangular in shape.

5. The dowel of claim 1 wherein each step is substantially a 90° angle taken with respect to the dowel's axis.

6. The dowel of claim 1 wherein each step is substantially convex in shape.

7. The dowel of claim 1 wherein each step is substantially concave in shape.

8. The dowel of claim 1 wherein the dowel is constructed of at least two different materials.

9. The dowel of claim 1 wherein the dowel is constructed of wood and the dowel has a metal insert that is positioned substantially axially and extends through the dowel from the base to the tip.

10. The dowel of claim 1 wherein an adhesive attaches each dowel section to an adjacent dowel section.

11. The dowel of claim 1 wherein the dowel is constructed from a single piece of material.

12. The dowel of claim 1 wherein the dowel section having the smallest diameter is at least as long as the length of any of the other dowel sections.

13. The dowel of claim 1 wherein each of the dowel sections have the same length.

14. A method for connecting a plurality of components together which consists of the steps of:
   providing a dowel having three dowel sections and having successively decreasing diameters along the length of the dowel;
   providing a plurality of components having openings that will accept the dowel;
   aligning the openings; and
   inserting the dowel into the aligned openings.

15. The method of claim 14 further comprising the step of the dowel aligning the plurality of components when the dowel is inserted into the openings.

16. A one piece dowel for connecting two or more adjacent components, consisting of:
   a first, second, and third cylinder, said second cylinder being of a smaller diameter than said first cylinder and a larger diameter than said third cylinder, said first, second and third cylinders arranged directly adjacent each adjoining cylinder in order of decreasing size and about a common axis.

17. The one piece dowel of claim 16 wherein the third cylinder is at least as long as each of the other cylinders.

18. The dowel of claim 16 wherein the dowel is constructed of at least two different materials.

19. The dowel of claim 16 wherein the dowel is constructed of wood and the dowel has a metal insert that is positioned substantially axially and extends through the first, second and third cylinders.

20. A method for connecting two or more adjacent components consisting essentially of the steps of:
   providing a dowel having a first, second and third cylinder, said second cylinder being of a smaller diameter than said first cylinder and a larger diameter than said third cylinder, said first, second and third cylinders arranged directly adjacent each adjoining cylinder in order of decreasing size and about a common axis;
   providing a plurality of components having openings that will accept the dowel;
   using the dowel to align the component openings; and
   inserting the dowel into the aligned openings.

* * * * *